March 5, 1968      J. J. BARTEL      3,371,375
MACHINES FOR AIDING IN SKINNING SMALL ANIMALS
Filed Oct. 19, 1965      2 Sheets-Sheet 1
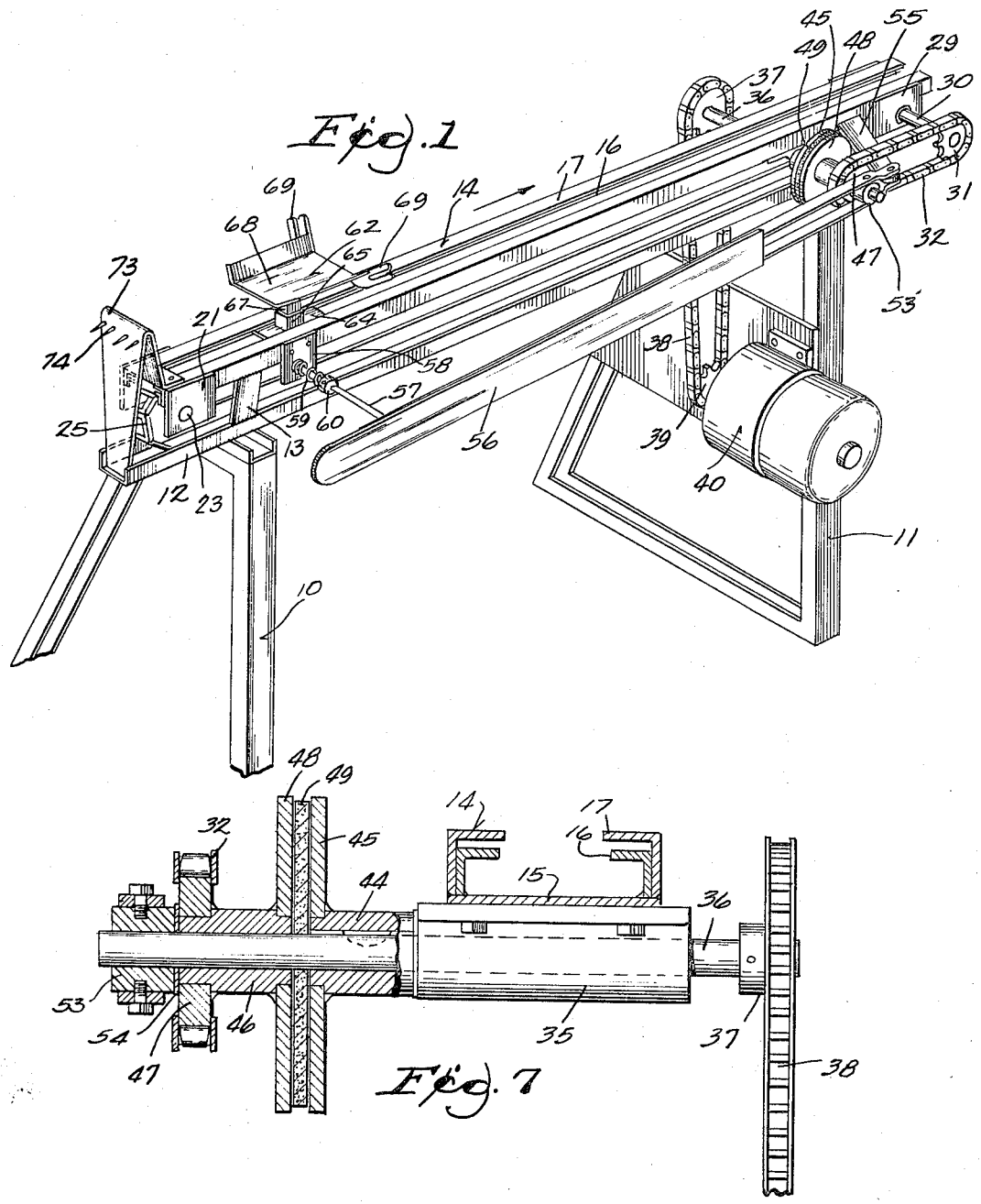
INVENTOR
JOSEPH J. BARTEL
BY Wheeler, Wheeler & Wheeler
ATTORNEYS March 5, 1968          J. J. BARTEL          3,371,375
MACHINES FOR AIDING IN SKINNING SMALL ANIMALS
Filed Oct. 19, 1965          2 Sheets-Sheet 2
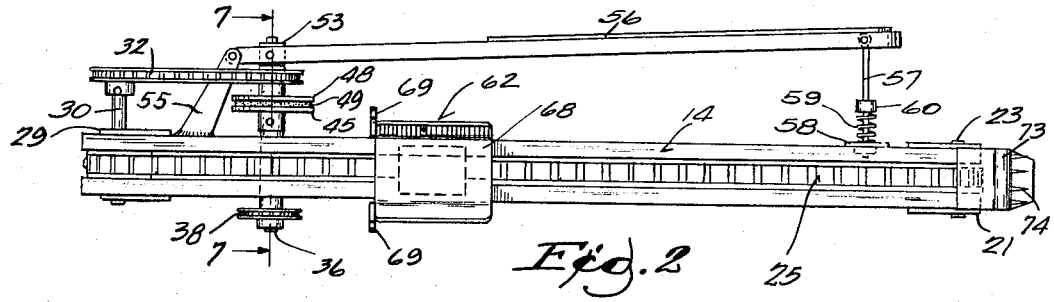
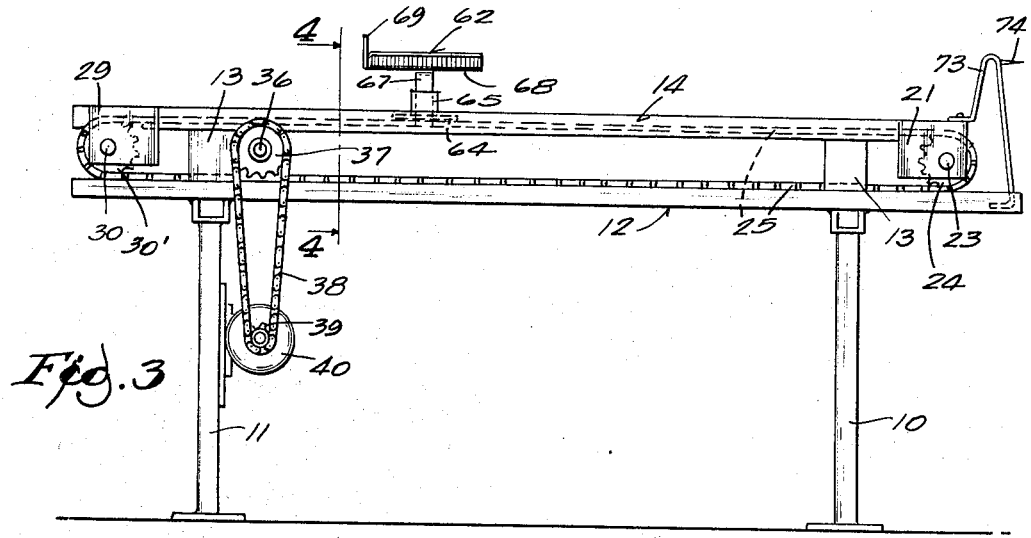
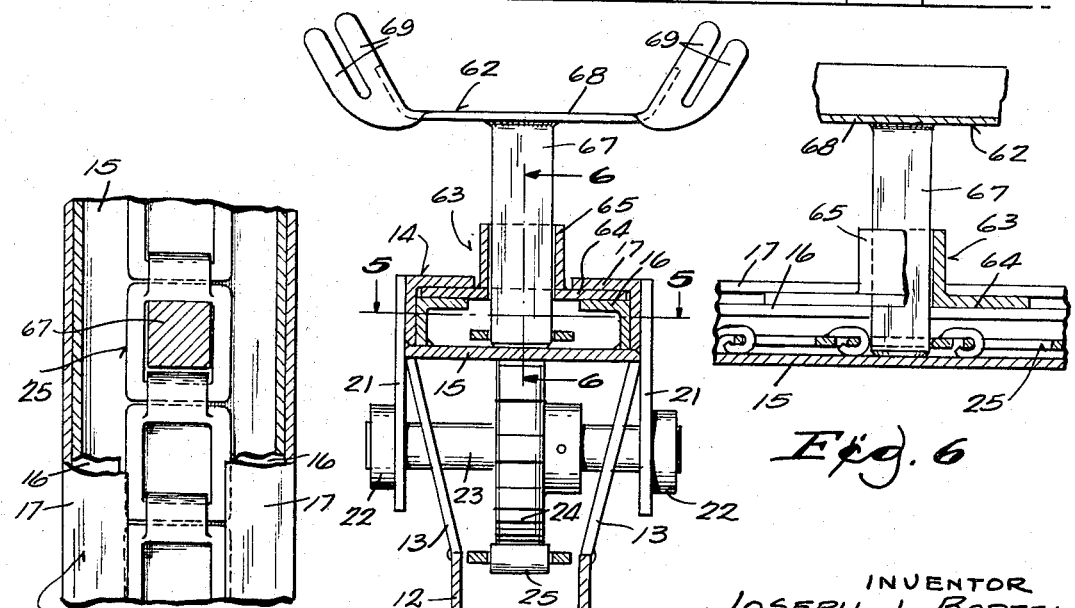
INVENTOR
JOSEPH J. BARTEL
BY Wheeler, Wheeler & Wheeler
ATTORNEYS

United States Patent Office 3,371,375
Patented Mar. 5, 1968

3,371,375
MACHINES FOR AIDING IN SKINNING
SMALL ANIMALS
Joseph J. Bartel, R.R. 2, Box 70,
New Holstein, Wis. 53061
Filed Oct. 19, 1965, Ser. No. 497,963
5 Claims. (Cl. 17—21)

ABSTRACT OF THE DISCLOSURE

A machine for removing the skin from animals includes an elongated frame which supports sprocket wheels and an endless pull chain driven by an electric motor. The frame also includes slideways for guiding movement of a carriage which is engageable with the pull chain. The body of the animal is attached to one end of the frame and flaps of skin from the rear legs are attached to ears on the carriage. Movement of the carriage to strip the skin from the body in the form of a tube with the fur on the inside is accomplished by leaning against a lever which extends longitudinally of the frame to engage a friction clutch and drive the pull chain.

---

This invention relates to improvements in machines for aiding in skinning small animals such as mink, and particularly to machines by which power replaces a manual operation for stripping the major portion of the skin off the body of the animal.

Breeding and raising of mink in captivity for their skins has resulted in the development of considerable numbers of ranches, each producing many thousands of pelts per year. Where ten to fifteen thousand animals per year must be skinned at one ranch, the skinning takes many man-days, most of the skinning being done in a relatively restricted time and the same crew of men continuing on the job until all the skinning is done. Repeating of the same hand and arm movements for several days in which several sets of muscles respectively perform a given function, such as gripping the skin and pulling the skin backward off the animal's body, results in overtaxing many muscles and in swelling of the skinner's hands and arms sufficiently to be painful and to interfere with the work. The skinning work is divided into several operations but the pulling and stripping off of the skins is by far the most laborious so that the men must frequently rotate in performing that operation but even so do not avoid muscle strains. Another objection to manually stripping off the skins is that both of the skinner's hands must be used in the gripping and pulling so that they are not available for loosening the skin or otherwise making certain that the skin releases freely from the body of the animal and is not torn during stripping.

It is desired that all the skins be pulled off the animal from the rear end of the animal over its head so that the skin is turned inside out as a tube and the skin of the forelegs is not cut but the forepaws have been removed. In skinning small animals such as mink, the skins are cut along the inside of the rear legs and around the legs adjacent the rear paws so that the skin covering the rear legs can be pulled away from the flesh as small sheets extending from the balance of the skin, which is tubular in shape. The skin is then otherwise freed from the rear portion of the animal body so that it can be turned with the hair side inward and pulled forward toward, and eventually over, the head of the animal. The skin is pulled off in one substantially continuous movement except for slight pauses as the skin is freed from the head by cutting around the ears, eyes and mouth, in that order.

The present invention relates to power operated means for pulling or stripping off the skins of animals and comprises an elongated frame supported on pedestals at a height so that a skinner can stand or walk alongside the frame with his arms hanging in a natural position for any manual aid required in connection with pulling off the skin. In some cases, the pedestals are omitted and the machine is mounted on a table with other skinning appliances. The frame rotatably supports a pull chain for straight line movement of a carriage to which the skin is attached. The pull chain is driven by an electric motor with gearing connected by sprocket wheels and chains to the pull chain. The drive to the pull chain is through a clutch operable by a lever extending along the frame for at least the full length of the movement required of the carriage and which returns the lever and clutch to disengaged position. Thus, the clutch can be operated as required by the skinner's leaning against the lever wherever he may be along the length of the frame during the stripping action. The carriage includes a member moving in a slideway in the frame as it is pulled by chain engagement with a carriage post, which is disengaged from the pull chain for returning of the sliding member and carriage to the forward end of the frame. The forward end of the machine is provided with means for holding the body of the animal while the skin is pulled off the body by the carriage, turning the skin flesh side outward during the process.

In the drawings:

FIG. 1 is a perspective view of the machine from the side on which the clutch and its operating lever are mounted.

FIG. 2 is a top plan view, omitting the supporting pedestals and the electric motor.

FIG. 3 is an elevation of the side of the machine opposite the side shown in FIG. 1.

FIG. 4 is a cross section taken on the line 4—4 of FIG. 3.

FIG. 5 is a cross section taken on the line 5—5 of FIG. 4.

FIG. 6 is a cross section taken on the line 6—6 of FIG. 4.

FIG. 7 is a fragment of the main drive shaft of the machine and of the clutch and of adjacent shaft portions, taken on the line 7—7 of FIG. 2.

Referring to the drawings by reference numerals, pedestals 10 and 11 carry a frame including a base channel 12 (see FIG. 4) from which supports 13 extend to carry an upper frame structure 14 which provides a floor and slideways above the floor. In the present machine, a plate 15 forms the floor and has two angles 16 and 17 of two different sizes attached edgewise longitudinally of the plate and in spaced relation to one another to provide opposite slideways with a slot between them. Side plates 21 are attached toward an end (designated the forward end) of the angles 16 and 17 and extend toward the channel 12 and each plate carries a bearing 22 for a forward shaft 23 on which is mounted a sprocket 24 for taking part in operating a pull chain 25. Rearward side plates 29 carry a first drive shaft 30 which has a sprocket 30′ comparable to the sprocket 24 and has another sprocket 31 externally of the frame for receiving a drive chain 32.

A relatively long bearing 35 is attached to floor plate 15 to receive a second drive shaft 36 with a sprocket 37 connected by a chain 38 to a sprocket 39 on the shaft of an electric motor 40. The electric motor is of the type having gearing associated therewith to reduce its output speed to 157 r.p.m. while the sprocket wheel and chain transmission from the gearing to the pull chain further reduces the speed of pull chain linear movement.

The drive shaft 36 has keyed thereto a first sleeve 44 on which is fixed a clutch plate 45 extending at right angles to the shaft. A second sleeve 46 is rotatably mounted on the shaft 36 and bears both a sprocket 47 on which the drive chain 32 also runs, and a second clutch plate 48 to act through a clutch friction member 49 on the first clutch plate 45 for thereby connecting the shaft 36 for driving by the sprocket 47. A collar 53 is movable axially on the shaft 36 and bears on the clutch plate 48 through a thrust washer 54, on the sprocket 47 to secure frictional engagement of the clutch plates 45, 48, 49. A bracket 55 extends from the frame to adjacent the collar 53 and serves as the pivotal mounting of a body engaging lever 56 which is also pivoted on the collar 53 for movement in a substantially horizontal plane and extends generally horizontally adjacent the forward end of the machine. The forward end of the lever is supported on and guided by a rod 57 movable axially through side plate 58. A compression spring 59 on the rod 57 acts between plate 58 and a collar 60 on the rod to return both the lever and clutch to neutral when pressure on the lever is released. Thus, a person standing alongside the machine and having both hands occupied in the skinning work can lean against the lever and cause engagement or release of the clutch and afford intermittent motion or movement of the pull chain 25 to any degree desired.

The pull chain 25 has an upper reach sliding on the frame floor 15 in the direction of the arrow shown in FIG. 1, when the clutch 45, 48, 49 is engaged, while the lower and return reach of such chain moves in the opposite direction in the frame channel 12. A carriage 62 includes a sliding member 63 with a plate 64 movable longitudinally of the frame in the slideways formed by the side frame angles 16, 17 and with a square tube 65 extending from about a hole in the plate to above the frame. The carriage also includes a square post 67 extendable through the slider tube 65 to engage the pull chain 25 and to bear endwise on the frame floor 15. A plate 68 is attached to the upper end of the post 67 to extend substantially horizontally and form a platform with two ears 69 to which parts of the animal skin are attached for pulling on the skin as the carriage is drawn rearwardly by the pull chain. At the forward end of the frame is mounted means for holding the animal body against longitudinal movement, shown as a plate 73 with a rounded upper surface and pins 74 extending forwardly of the frame to provide means by which the body of the animal may be held while the skin is being stripped off. Such holding means may, of course, be means for clamping or otherwise holding the body of the animal against movement longitudinally of the frame.

In use of the present machine, a mink having its rear legs previously skinned and having the skin cut at the rear end of the body so that it can be pulled "backward" off the body is placed on the means for holding the body. The skin of the mink is turned forward over the body and flaps of skin from the rear legs are severally attached to the carriage ears 69. Assuming that the motor is running, the operator now leans against the lever 56 to engage clutch 45, 48, 49 and cause pull chain 25 to draw sliding member 63 and the carriage 62, 67, 68 toward the rear of the machine at a speed controlled by the operator. The animal's body does not move lengthwise of the frame but the skin is pulled backward off the body and is turned hair side in during the pulling. Both the operator's hands are free to aid in loosening the skin if it should not come free uniformly. Assuming that the forepaws have been previously cut off, the skin pulls off the animal down to the point of attachment to the head. When the stripping of the skin approaches the head, it is necessary to cut the skin loose from the ears, eyes and jaws. Thus, the operator does not use his hands to grip and pull the skin, but his hands, and especially his fingers, remain free to manipulate the skin or the cutting tools. By eliminating the gripping and pulling formerly required, the present machine eliminates the labor and the swelling of hands and arms formerly experienced when large numbers of mink had to be skinned during the relatively short season when the fur is in prime condition.

When the mink has been skinned, the body is disposed of and the skin is removed and placed on a drying board. The carriage is then lifted to release the post from the pull chain and the slider is drawn toward the forward end of the machine. When the carriage is in a position so that the rear leg skins can be attached to the carriage and the body is held at the forward end of the machine, the carriage is dropped to re-engage the post with the pull chain and the skin stripping action is repeated.

I claim:

1. In a machine for aiding in skinning small animals after the skin is cut free from most of the points of attachment to the animal body, an elongated frame, an endless pull chain mounted within the frame for movement longitudinally thereof, power means for driving the pull chain in one direction and including a clutch for controlling transmission of the power to the pull chain and a body engaging lever extending generally horizontally along the frame for engaging the clutch upon pressure against the lever, to afford intermittent motion of said pull chain means at one end of the frame for holding the animal body above the frame and against movement longitudinally of the frame, and a carriage for attachment thereto of a free end of the skin and for engagement with the pull chain for moving the carriage along the frame away from the holding means and thereby stripping the skin off the body.

2. The machine of claim 1 in which the power means includes an electric motor having speed reducing means and mounted toward the end of the frame opposite the holding means, and drive means for transmitting power from the motor to drive the pull chain, and the clutch-engaging lever extends along the greater portion of the length of the frame said lever being pivotal in a substantially horizontal plane.

3. The machine of claim 1 in which the lever extends substantially along the full length of the frame, and a rod connected with the lever engages the frame for movement axially of the rod and across the frame, and a spring is mounted on the rod for resisting movement of the lever in one direction and returning the lever and clutch to neutral upon release of pressure on the lever.

4. The machine of claim 1 in which the frame includes a floor and slideways above the floor and extending longitudinally of the frame and the carriage includes a member sliding in the frame slideways, and a plate forming a platform and a post attached to the plate for removable engagement with the sliding member and the pull chain, the end of post bearing on the frame floor during movement of the carriage by the pull chain.

5. In a machine for aiding in skinning small animals after the skin is cut free from most of the points of attachment to the animal body, an elongated frame, an endless pull chain mounted within the frame for movement longitudinally thereof, power means for driving the pull chain in one direction and including a clutch for controlling transmission of the power to the pull chain and a lever extending along the frame for engaging the clutch upon pressure against the lever, means at one end of the frame for holding the animal body above the frame and against movement longitudinally of the frame, and a carriage for attachment thereto of a free end of the skin and for engagement with the pull chain for moving the carriage along the frame away from the holding means and thereby stripping the skin off the body, said frame further including slideways extending the length of the frame and said carriage including a plate movable longitudinally of the frame in the slideways, said carriage further including a tube extending through said plate to above said frame, a post extending through said tube and reciprocal in said tube into and from engagement with said pull chain and a platform attached to said post.

References Cited

UNITED STATES PATENTS

| | | | |
|---|---|---|---|
| 2,461,466 | 2/1949 | Coad | 17—21 |
| 2,545,718 | 3/1951 | Weber | 17—21 |
| 3,024,491 | 3/1962 | Mills | 17—21 |

LUCIE H. LAUDENSLAGER, *Primary Examiner.*